United States Patent
Mutoh

(10) Patent No.: US 8,238,052 B2
(45) Date of Patent: Aug. 7, 2012

(54) METHOD AND APPARATUS FOR MEASURING PHASE SHIFT IN A DISK DRIVE HAVING BIT-PATTERNED MEDIA

(75) Inventor: Hiroshi Mutoh, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 12/726,324

(22) Filed: Mar. 17, 2010

(65) Prior Publication Data

US 2010/0238577 A1    Sep. 23, 2010

(30) Foreign Application Priority Data

Mar. 18, 2009   (JP) ................ 2009-065362

(51) Int. Cl.
G11B 5/09    (2006.01)
G11B 27/36   (2006.01)
(52) U.S. Cl. .......................... 360/51; 360/31
(58) Field of Classification Search .......... None
See application file for complete search history.

(56) References Cited

U.S. PATENT DOCUMENTS

2010/0118426 A1*  5/2010  Vikramaditya et al. ........ 360/51
2010/0118429 A1*  5/2010  Vikramaditya et al. ........ 360/51

FOREIGN PATENT DOCUMENTS

| JP | 2000-48352 | 2/2000 |
| JP | 2004-199806 | 7/2004 |
| JP | 2006-164349 | 6/2006 |

* cited by examiner

Primary Examiner — Daniell L Negron
Assistant Examiner — Regina N Holder
(74) Attorney, Agent, or Firm — Knobbe, Martens, Olson & Bear LLP

(57) ABSTRACT

According to one embodiment, a disk drive comprising a magnetic disk of bit-patterned type is provided. The disk drive has a reproduction module, a measurement module, and a recording module. The reproduction module outputs a reproduced signal corresponding to the phase-shift measuring bits provided on the magnetic disk. The measurement module determines that the phase shift corresponding to the phase-shift measuring bits is the phase shift of a write clock signal if the reproduced signal is determined to be indefinite on the basis of the quantization value of the reproduced signal. The recording module records data corresponding to the data recording bits, by using the write clock signal adjusted by the phase shift.

6 Claims, 7 Drawing Sheets

| n | Phase shift (degrees) |
|---|---|
| 0 | 180 |
| 1 | 240 |
| 2 | 300 |
| 3 | 0 |
| 4 | 60 |
| 5 | 120 |
FIG. 2
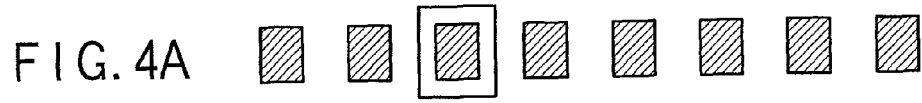
FIG. 4A
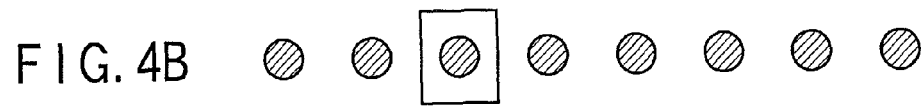
FIG. 4B
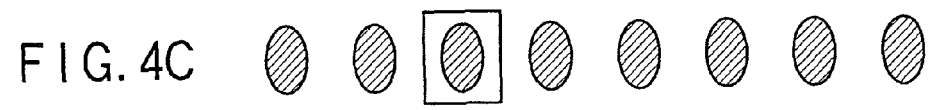
FIG. 4C
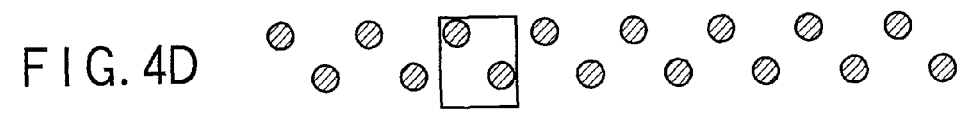
FIG. 4D
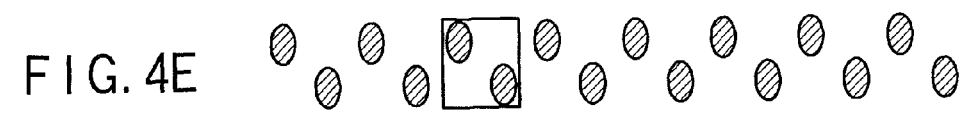
FIG. 4E

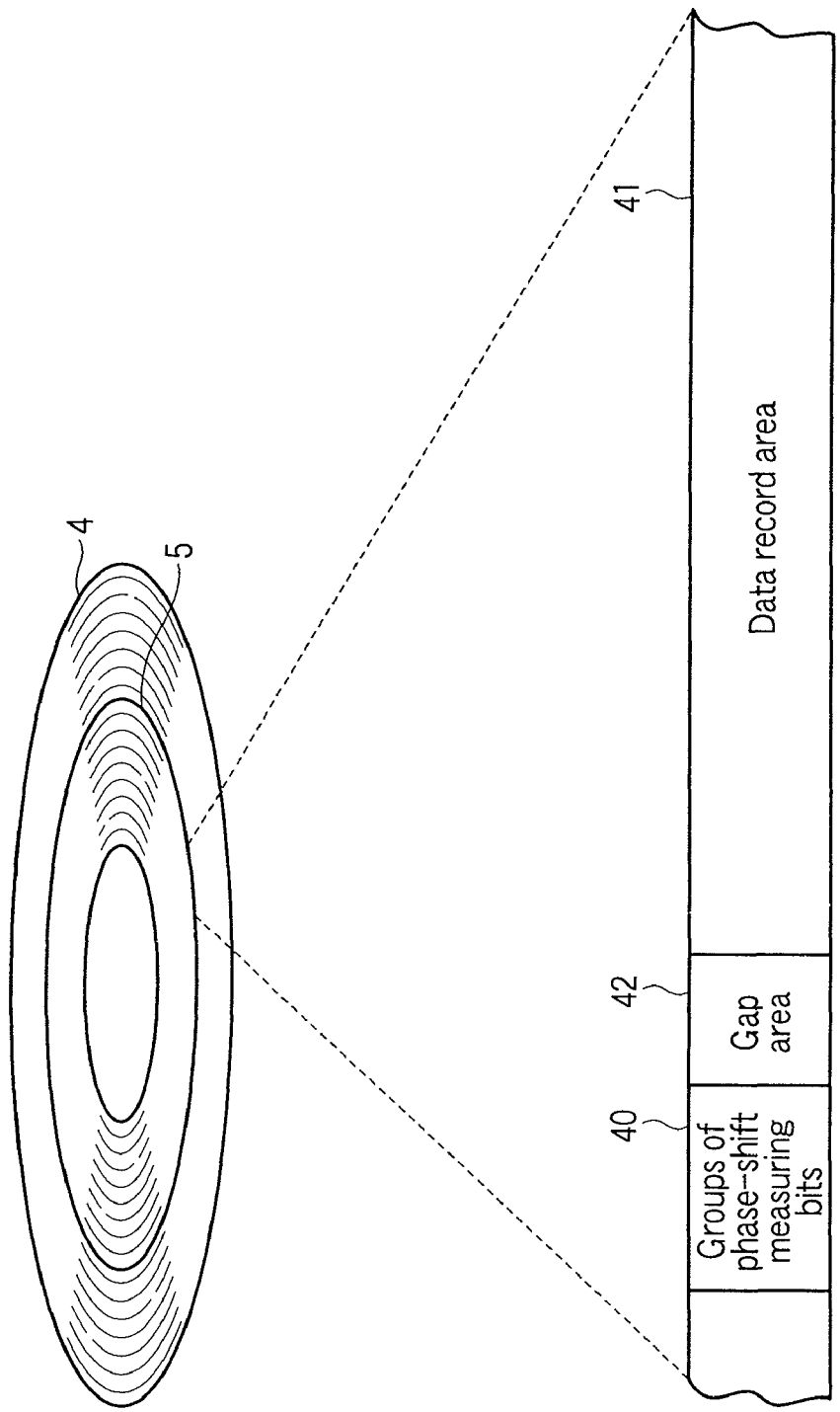

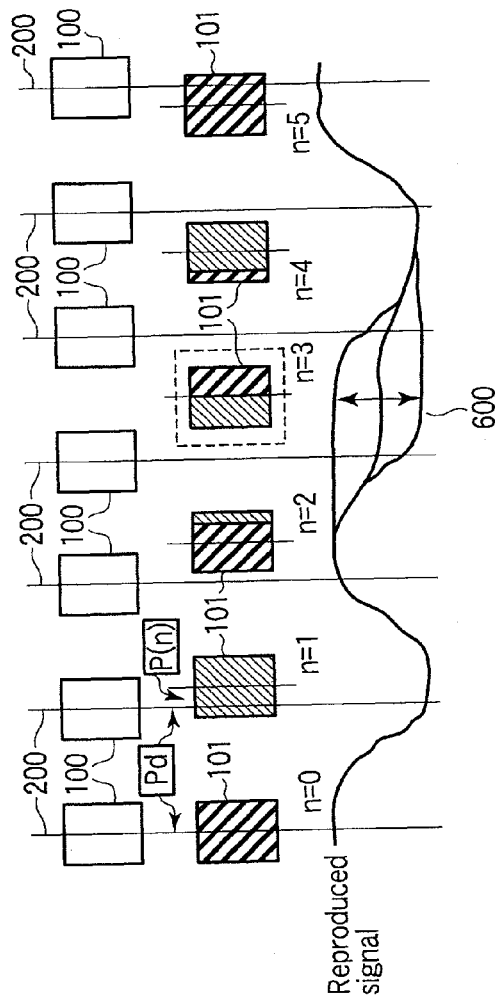
FIG. 6
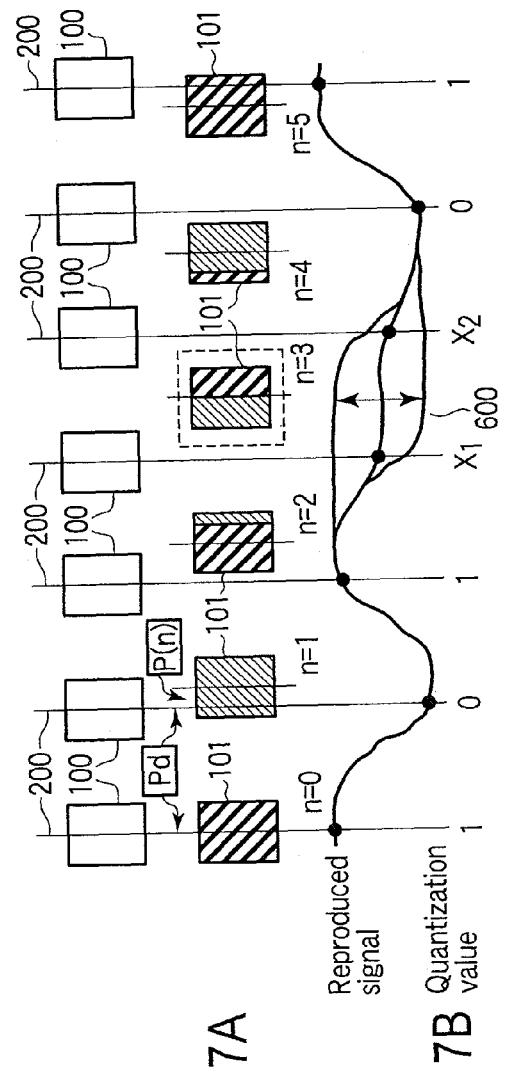
FIG. 7A
FIG. 7B

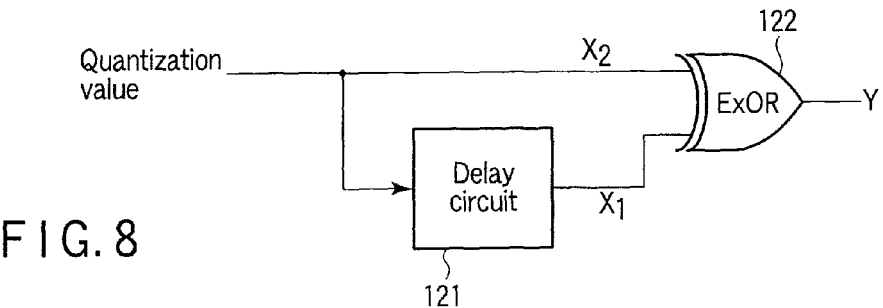
FIG. 8
FIG. 9A
FIG. 9B
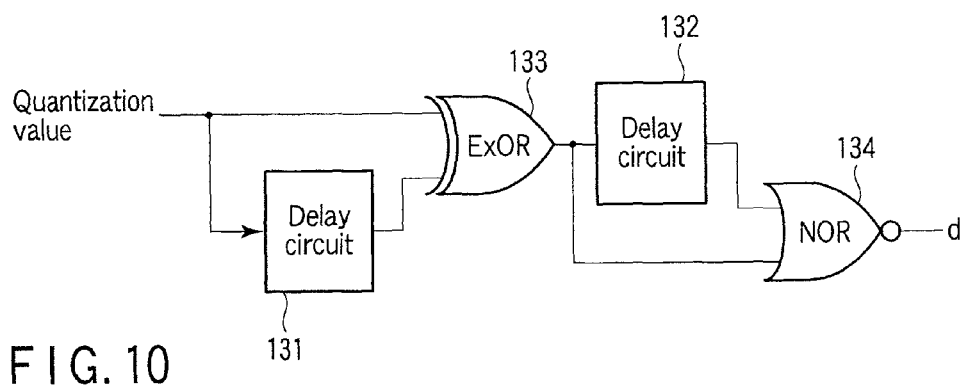
FIG. 10

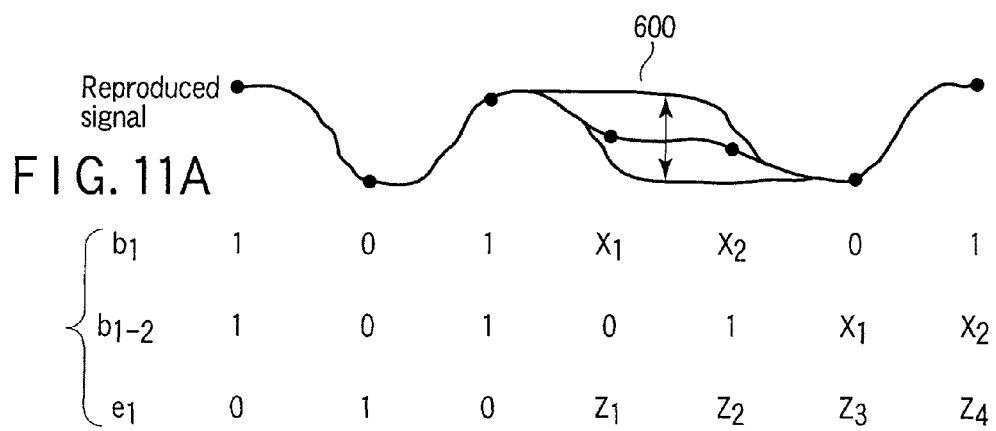
F I G. 11A
| $b_1$   | 1 | 0 | 1 | $x_1$ | $x_2$ | 0     | 1     |
| $b_{1-2}$ | 1 | 0 | 1 | 0     | 1     | $x_1$ | $x_2$ |
| $e_1$   | 0 | 1 | 0 | $z_1$ | $z_2$ | $z_3$ | $z_4$ |
F I G. 11B
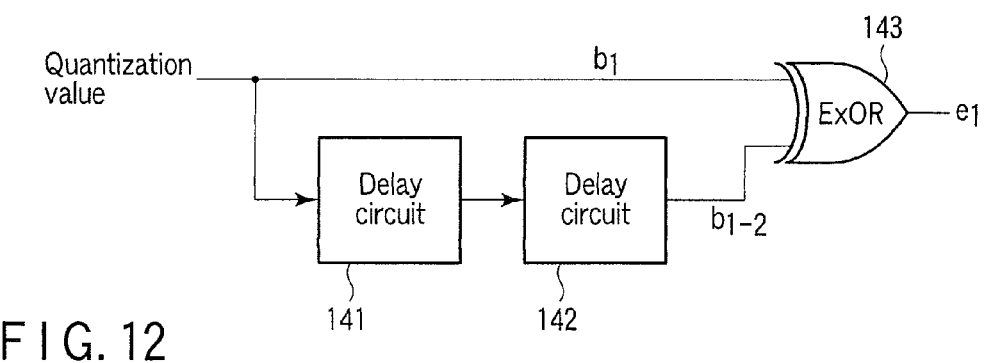
F I G. 12

METHOD AND APPARATUS FOR MEASURING PHASE SHIFT IN A DISK DRIVE HAVING BIT-PATTERNED MEDIA

CROSS-REFERENCE TO RELATED APPLICATIONS

This application is based upon and claims the benefit of priority from Japanese Patent Application No. 2009-065362, filed Mar. 18, 2009, the entire contents of which are incorporated herein by reference.

BACKGROUND

1. Field

One embodiment of the present invention relates to a disk drive having bit-patterned media, and more particularly to a technique of measuring the phase shift of a write clock signal.

2. Description of the Related Art

In recent years, various techniques have been developed to achieve high-density data recording, as demand increase for large storage capacity in the field of disk drives, a representative example of which is the hard disk drive. Attention is now being paid to a bit-patterned media (BPM) system, which is a technique for achieving high-density data recording. The BPM system is a recording system that records data bits in association with magnetic dots or magnetic dot groups which are formed on a magnetic disk (i.e., recording medium) and which are magnetically independent of one another.

In the BPM system, the magnetic dots or magnetic dot groups (hereinafter, generally called "magnetic dots") formed on the magnetic disk must be synchronous with the transition timing of the write current. (This synchronization will be referred to as "recording synchronization".) If the recording synchronization is incomplete, the write current will undergo transition at, for example, the center of each magnetic dot provided on the magnetic disk. Consequently, the magnetization direction of each magnetic dot will become indefinite, resulting in a write error.

To prevent such write errors, it is necessary to generate a write clock signal of high precision that is synchronous with the magnetic dots formed on the disk. Methods of generating such a write clock signal have been proposed. In one of these methods, a preamble (region), in which a continuous pattern is recorded, is arranged at the head of each sector and detected in preparation of recording data, and a write clock signal is generated from the continuous pattern reproduced from the preamble.

Since the detection of the preamble is synchronous with the reproduced signal in the above-mentioned prior art, the timing of recording data in synchronism with the magnetic dots is indeed synchronous in terms of frequency with the magnetic dots. However, the write clock signal and the magnetic dots are not always synchronous in terms of phase. Consequently, precise recording synchronization cannot be accomplished. In the disk drive, the data reproduction circuit (read channel) and the data recording circuit (write channel) delay data signals differently, because they are circuits that operate independently. Further, since the write head and the read head are physically spaced apart from each other and are different in configuration, they differ in terms of delay time. Therefore, the write clock signal is hardly be correctly synchronized with the magnetic dots even if the detection of the preamble is synchronous with the reproduced signal.

In order to solve this problem, a data recording apparatus has been proposed, in which the write clock signal is delayed so that the error rate may become optimal, thereby to accomplish recording synchronization (see the above-identified document). In this data recording apparatus, however, the read channel must be optimized in order to determine the error rate. Moreover, the bits on the magnetic disk must be synchronized with the timing of recording data on the disk in order to optimize the read channel. In the data recording apparatus described above, an equalizer that performs waveform equalization on a read signal for a partial response is used to determine the error rate. However, the equalizer may not always be optimized in the apparatus. Therefore, it cannot be determined whether the error rate determined is optimal or not. As a result, the bits on the magnetic disk cannot be synchronized with the timing of recording data on the magnetic disk.

Further, the phase shift of the write clock signal must be measured at high accuracy and then adjusted with the phase shift measured, in order to generate a write clock signal that is synchronous with the bits formed on the magnetic disk.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is a diagram showing an exemplary phase-shift table according to the embodiment;

FIG. 3 is a diagram illustrating an exemplary track format according to the embodiment;

FIGS. 4A, 4B, 4C, 4D and 4E are diagrams illustrating various examples of phase-shift measuring bits that may be used in the embodiment;

FIG. 6 is a diagram explaining the process of finding phase-shift measuring bits in the embodiment;

FIGS. 7A and 7B are diagrams, also explaining the process of finding phase-shift measuring bits;

FIG. 8 is a diagram explaining the configuration of a phase-shift measurement module according to the embodiment;

FIGS. 9A and 9B are diagrams explaining a process of finding phase-shift measuring bits in another embodiment of this invention;

FIG. 10 is a diagram explaining the configuration of a phase-shift measurement module according to still another embodiment;

FIGS. 11A and 11B are diagrams explaining a process of finding phase-shift measuring bits in still another embodiment of this invention; and FIG. 12 is a diagram explaining the configuration of a phase-shift measurement module according to a further embodiment.

DETAILED DESCRIPTION

Various embodiments according to the invention will be described hereinafter with reference to the accompanying drawings. In general, according to one embodiment of the invention, there is provided a disk drive that has the function of measuring the phase shift of a write clock signal, in order to generate a high-precision write clock signal synchronous with the record bits formed on a magnetic disk.

[Configuration of the Disk Drive]

Figure 1:
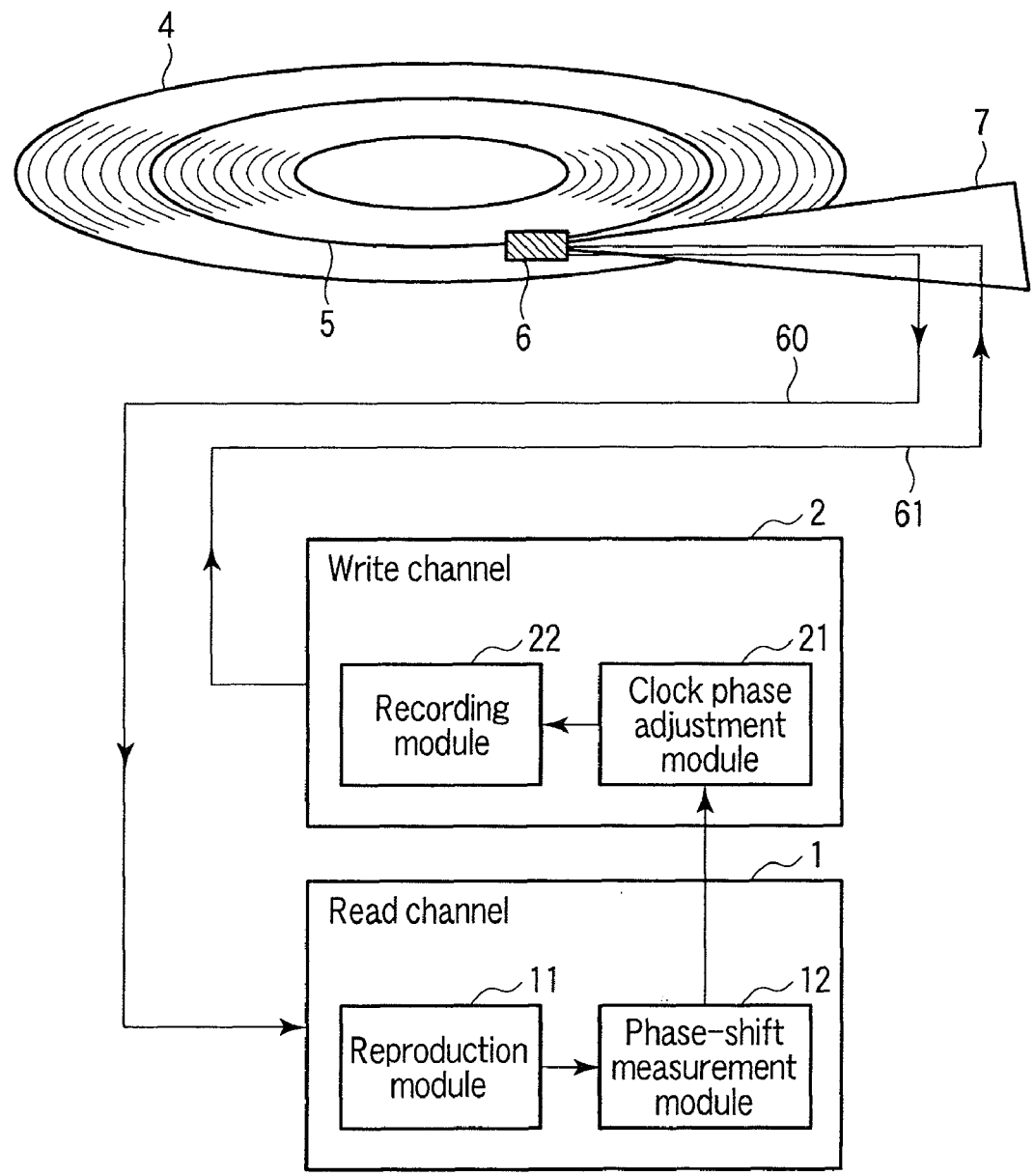
FIG. 1 is a diagram explaining the configuration of a disk drive according to an embodiment of this invention.

FIG. 1 is a diagram explaining the configuration of a disk drive according to an embodiment of the present invention. As shown in FIG. 1, the disk drive has a magnetic disk 4, a head 6, a read channel 1, a write channel 2, and a controller 3. The head 6 includes a read head and a write heat. The read channel 1 reproduces data from a read signal 60 read by the read head from the magnetic disk 4. The write channel 2 outputs a write signal 61, which is supplied to the write head. The write head records the write signal 61 on the magnetic disk 4. The head 6 is mounted on an actuator 7 and can be moved in the radial direction of the magnetic disk 4 and positioned at a target position over the magnetic disk 4.

In the disk drive, a head amplifier (not shown) is provided between the head 6, on the one hand, and the read channel 1 and write channel 2 on the other. The head amplifier amplifies the read signal 60 output from the read head, and converts the write signal 61 output from the write channel 2, to a write current that drives the write head. The head amplifier is not described herein, for the sake of convenience. In the disk drive, a controller (not shown) controls the read channel 1 and the write channel 2, thereby controlling data recording and data reproduction.

The magnetic disk 4 is a recording medium that is a bit-patterned medium (BPM). That is, magnetic dot groups that are physically isolated from one another are formed in each track 5 provided on the magnetic disk 4. The data recorded on the magnetic disk 4, in units of bits, corresponds to one magnetic dot or a plurality of magnetic dots. Phase-shift measuring bits and data recording bits are recorded in the track 5. Each of the phase-shift measuring bits and data recording bits corresponds to one magnetic dot or a plurality of magnetic dots. The phase-shift measuring bits are used to measure, from a reproduced signal, the phase shift that the write clock signal has with respect to the data recording bits.

Assume that the phase-shift measuring bits have been recorded by using a prescribed write clock signal in the present embodiment. Then, the bit group for measuring the phase shift may be recorded by using a write clock signal that has the highest frequency any write clock signal can have to record the data recording bits data. The data recording bits are used to record user data. The bit group for measuring the phase shift is formed in a data record area other than the data record area in which the bit group for recording data is formed.

The read channel 1 has a reproduction module 11 and a phase-shift measurement module 12. The reproduction module 11 outputs a signal reproduced from the phase-shift measuring bits, including one or more magnetic dots formed in the track 5. The phase-shift measurement module 12 reads a reproduced signal output from the reproduction module 11, by using a clock signal for reading the data recording bits formed on the magnetic disk 4, and then finds the quantization value of the reproduced signal. Further, the phase-shift measurement module 12 determines whether the reproduced signal is indefinite or not, based on the quantization value thus found.

Assume that the reproduced signal is indefinite. Then, it cannot be determined to which magnetization direction the level of the reproduced signal corresponds, in the phase-shift measuring bits, which have been magnetized by the recording magnetic field based on the write clock. More specifically, the phase-shift measurement module 12 first determines the bits for measuring phase shift corresponding to the reproduced signal determined to be indefinite. The phase-shift measurement module 12 then determines that the phase shift corresponding to the bits thus determined is the phase shift of the write clock signal, on the basis of the association data stored in a phase-shift table 13.

The phase-shift table 13 holds the data representing the association data representing the association between the phase-shift measuring bits and the various phase-shift values the write clock signal may have with respect to the phase-shift measuring bits. Hence, the disk drive according to this embodiment can measure the phase shift of the write clock signal at high accuracy. The disk drive adjusts the write clock signal on the basis of the phase shift measured, and can therefore generate a write clock signal that is synchronous with the magnetic dots formed on the magnetic disk 4.

The phase-shift measurement module 12 determines whether the exclusive logical sum of the present quantization value and the quantization value at one clock pulse before is "0" or not. If the exclusive logical sum is "0," the phase-shift measurement module 12 will determine that the reproduced signal is indefinite. Thus, the phase shift of the write clock signal can be measured at high precision, on the basis of the exclusive logical sum of the present quantization value and the quantization value at one clock pulse before.

Alternatively, the phase-shift measurement module 12 may first find the exclusive logical sum of the present quantization value and the quantization value at one clock pulse before, and may then determine whether the inverse of this exclusive logical sum is "1" or not. If the inverse of the exclusive logical sum is "1," the phase-shift measurement module 12 will determine that the reproduced signal is indefinite.

Still alternatively, the phase-shift measurement module 12 may determine whether the exclusive logical sum of the present quantization value and the quantization value at two clock pulses before is "1" or not. If the exclusive logical sum is "1," the phase-shift measurement module 12 will determine that the reproduced signal is indefinite. Thus, the phase shift of the write clock signal can be measured at high precision, on the basis of the exclusive logical sum of the present quantization value and the quantization value at two clock pulses before.

The channel 2 has a clock phase adjustment module 21 and a recording module 22. The clock phase adjustment module 21 generates a write clock signal on the basis of the phase shift measured by the phase-shift measurement module 12. The write clock signal, so generated, will be used to record data in the data record area of the magnetic disk 4, in which the data recording bits are formed.

The clock phase adjustment module 21 adjusts the phase of the write clock signal, cancelling or minimizing the phase shift measured. The write clock signal is thereby synchronized with the data recording bits. The recording module 22 uses the write clock signal thus generated (or adjusted), supplying a write current (write signal) to the write head of the head 6. The write head records the data corresponding to the data recording bits generated from the write current, in the data record area of the magnetic disk 4. Thus, synchronization can be achieved to record data that corresponds to the data recording bits.

FIG. 2 is a diagram showing an example of the phase-shift table 13. As shown in FIG. 2, the phase-shift table 13 may hold, for example, the order (n) in which the phase-shift measuring bits formed on the magnetic disk 4 are arranged, and various phase shifts the write signal may have. Note that these phase shifts are associated with the respective phase-shift measuring bits.

FIG. 3 is a diagram illustrating an exemplary format of each track formed on the magnetic disk 4. As shown in FIG. 3, an area 40, in which the bit groups for measuring phase shift are formed, is positioned before a data record area 41 in which bit groups for recording data are formed. More precisely, the area 40 is positioned before a gap area 42 that precedes the data record area 41. Each track is divided into a plurality of sectors. The head part of each sector is a preamble, as pointed out earlier. The phrase of "Positioned before a gap area 42" means an area following the preamble area of the sector. The gap area 42 has a length equivalent to the time needed to measure the phase shift and generate the write clock signal.

FIGS. 4A to 4E are diagrams illustrating various examples of phase-shift measuring bits that may be used in the present embodiment. As seen from FIGS. 4A to 4E, any rectangle represents an area in which a bit for recording one data bit, and corresponds to a magnetic dot (black dot). That is, in the case of FIGS. 4A to 4C, one magnetic dot corresponds to one data recording bit. In the case of FIGS. 4D and 4E, a plurality of magnetic dots (i.e., two dots) corresponds to one data recording bit.

Further, the magnetic dots are rectangular as seen from FIG. 4A. Alternatively, they may be circular as shown in FIGS. 4B and 4D. Still alternatively, they may be elliptic as shown in FIGS. 4C and 4E. Each bit for measuring phase shift corresponds to one or more magnetic dots, as the data recording bits, which are shown in FIGS. 4A to 4E.

(Method of Measuring the Phase Shift)

Figures 5A, 5B, 5C:
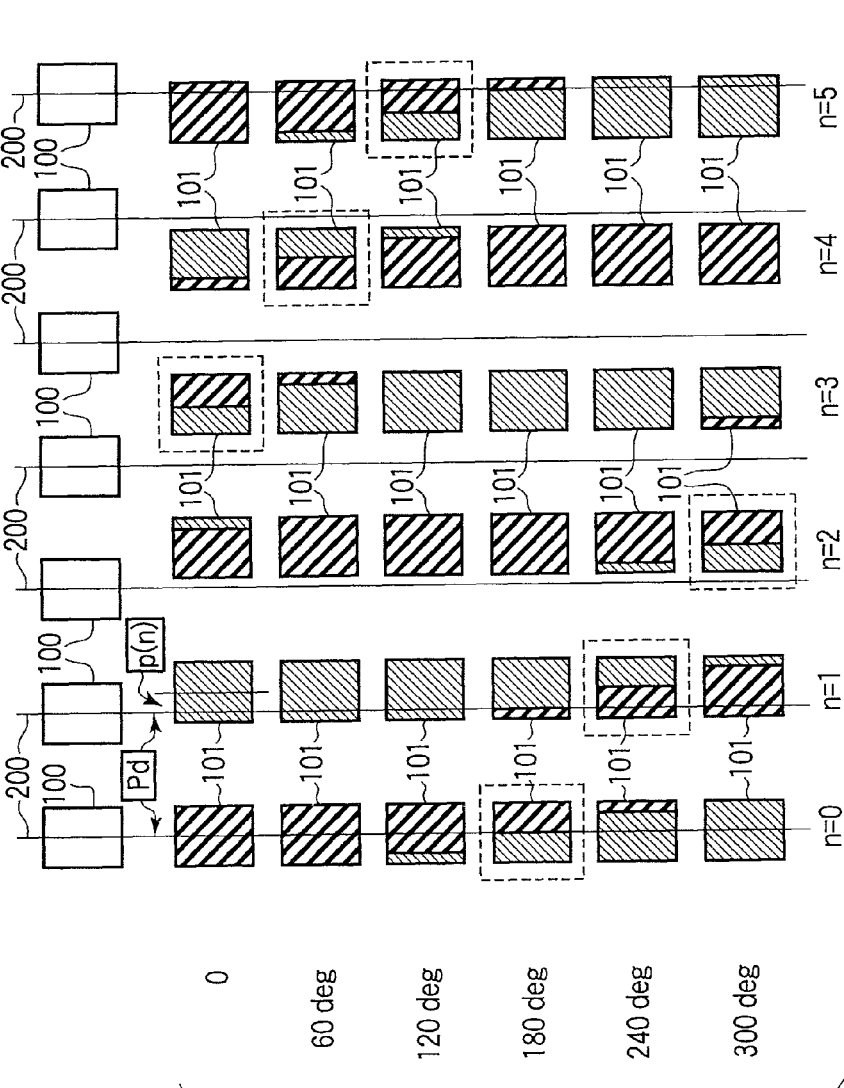
FIGS. 5A, 5B and 5C are diagrams explaining a process of finding phase-shift measuring bits in the embodiment.

FIGS. 5A to 5C and FIG. 6 are diagrams explaining an exemplary process of finding phase-shift measuring bits that correspond to the reproduced signal. More precisely, FIG. 5A shows the waveform of a write current, FIG. 5B shows data recording bits 100, and FIG. 5C shows phase-shift measuring bits 101.

The waveform indicated by a block line in FIG. 5A is the waveform of a write current that has a zero-degree phase shift with respect to the data recording bits 100 shown in FIG. 5B, i.e., the distance from the midpoint between two adjacent data recording bits 100 to the transition point of the recording magnetic field. In this embodiment, each phase-shift measuring bit 101 is arranged at a predetermined distance from the cyclic reference position 200 of a data recording bit 100.

Here, "n" is the order in which the phase-shift measuring bits 101 (including the magnetic dots formed on the magnetic disk 4) are arranged. "p(n)" is the distance by which the nth phase-shift measuring bit 101 deviates from the reference position 200. "Pd" is the cycle of the data recording bits. "N0" is the divisor applied to $2\pi$ corresponding to the phase-shift measuring resolution $\Delta\omega$.

The phase-shift measuring bits 101 are arranged, satisfying the equation of P(n)=Pdn/N0. Note that the phase-shift measuring resolution $\Delta\omega$ is given as $2\pi/N0$.

Of each phase-shift measuring bit 101 shown in FIG. 5C, any hatched part has been magnetized. Each hatching pattern indicates the direction in which the part has been magnetized. Hence, different hatching patterns indicate different magnetization directions. Of each phase-shift measuring bit 101, that part where the hatching patterns changes is the position where the recording magnetic field is undergoing transition. The transition of the recording magnetic field may occur at the center of a phase-shift measuring bit 101. In this case, the signal reproduced from this phase-shift measuring bit 101 becomes indefinite.

In the disk drive according to this embodiment, a phase-shift measuring bit 101 is found, at which the recording magnetic field is undergoing transition at the center. (The signal reproduced from such a phase-shift measuring bit 101 is indefinite.) Then, the phase shift corresponding to the bit 101 found is measured, with reference to the phase-shift table 13.

As shown in, for example, FIG. 5C, of the phase-shift measuring bits 101 of the first column, the bit 101, at which the recording magnetic field is undergoing transition at the center, is a phase-shift measuring bit corresponding to n=3, encircled by a broken-line rectangle. That is, as shown in FIG. 6, the signal 600 reproduced from this phase-shift measuring bits 101 (n=3) is indefinite, because it cannot be determined which magnetization direction its level corresponds to.

The phase-shift measurement module 12 refers to, for example, the phase-shift table 13 of FIG. 2, determining zero degrees as the phase shift that corresponds to the phase-shift measuring bits 101 of n=3. As for the phase-shift measuring bits 101 of the second column shown in FIG. 5C, the phase-shift measurement module 12 determines that the signal reproduced from the phase-shift measuring bits 101 of n=4, encircled by a broken-line rectangle is indefinite. The phase-shift measurement module 12 then refers to the phase-shift table 13, determining 60 degrees as the phase shift that corresponds to the phase-shift measuring bits 101 of n=4. Similarly, as for the phase-shift measuring bits 101 of the third, fourth, fifth and sixth columns, the phase-shift measurement module 12 determines that the signals reproduced from the bit 101 of n=5, the bit of n=0, the bit of n=1, and the bit of n=2 are indefinite, as is illustrated in FIG. 5C. Finally, the phase-shift measurement module 12 determines that 120, 180, 240 and 300 degrees are the phase shifts corresponding to these phase-shift measuring bits 101, respectively.

FIGS. 7A and 7B are diagrams explaining a specific process of finding phase-shift measuring bits that correspond to an indefinite reproduced signal.

In this process, the phase-shift measurement module 12 reads the reproduced signal output from the reproduction module 11, by using a clock signal for reading the data recording bits formed on the magnetic disk 4. As shown in FIG. 7A, the phase-shift measurement module 12 acquires a read value corresponding to the black dot parts of the reproduced signal.

Next, as shown in FIG. 7B, the phase-shift measurement module 12 quantizes the read value thus acquired, thereby obtaining a quantization value. On the basis of the quantization value thus obtained, the phase-shift measurement module 12 determines whether the reproduced signal is indefinite. If the reproduced signal is indefinite, the phase-shift measurement module 12 finds the phase-shift measuring bits that correspond to the reproduced signal found to be indefinite.

More specifically, the phase-shift measurement module 12 quantizes the value of the reproduced signal read (i.e., read value), generating "1" if the reproduced signal increases in amplitude, and generating "0" if the reproduced signal decreases in amplitude. The quantization value is expressed as, for example, "101$X_1X_2$01" as shown in FIG. 7B. Here, $X_1$ and $X_2$ are quantization sub-values that correspond to the indefinite parts of the reproduced signal. In this instance, $X_1X_2$ is the value obtained by reading reproduced signal 600 from the phase-shift measuring bits of n=3. In consideration of the values that $X_1X_2$ may have, the quantized value is one of four possibilities, i.e., 1010001, 1011001, 1010101 and 1011101.

In the particular instance of FIG. 7A, however, the probability that the $X_1X_2$ is 10 or 01 is considered to be very low. Hence, it suffices to consider only two possible read values, i.e., 1010001 and 1011101. The phase-shift measurement module 12 therefore detects consecutive 0s or consecutive 1s in the quantization value. Upon detecting consecutive 0s or 1s, the phase-shift measurement module 12, the phase-shift measurement module 12 determines that the reproduced signal is indefinite. The phase-shift measurement module 12 then finds phase-shift measuring bits corresponding to the reproduced signal found to be indefinite. In the instance of FIGS. 7A and 7B, the phase-shift measurement module 12 determines that the phase-shift measuring bits of n=3 are those that correspond to the reproduced signal if $X_1X_2$ is either 00 or 11.

FIG. 8 is a diagram showing, in detail, the configuration of the phase-shift measurement module 12 according to the present embodiment.

As shown in FIG. 8, the phase-shift measurement module 12 has a delay circuit 121 and an exclusive OR (ExOR) gate 122. The delay circuit 121 outputs the quantization value at one clock pulse before. The ExOR gate 122 produces the exclusive logical sum of the present quantization value and the output value of the delay circuit 121, outputting an exclusive logical sum Y.

The ExOR gate 122 receives, for example, the present quantization value $X_2$ and the quantization value $X_1$ at one clock pulse before, output from the delay circuit 121, both values $X_2$ and $X_1$ being shown in FIG. 7B. If values $X_2$ and $X_1$ are 00 or 11, the ExOR gate 122 will output a value y of "0." Then, the phase-shift measurement module 12 determines whether the output value Y is 0. If the value Y is 0, it determines that the reproduced signal is an indefinite signal that contains consecutive 0s or 1s.

As has been described, this embodiment can measure the phase shift of the write clock signal at high precision, on the basis of the exclusive logical sum of the present quantization value and the quantization value at one clock pulse before. Therefore, the clock phase adjustment module 21 can adjust the phase of the write clock signal to cancel or minimize the phase shift measured, and a write clock signal synchronous with the data recording bits can be ultimately generated.

OTHER EMBODIMENT

FIGS. 9A, 9B and 10 are diagrams explaining another embodiment of the present invention. The disk drive according to this embodiment is identical in configuration to the disk drive shown in FIG. 1, except the circuit configuration shown in FIG. 10. Hence, the other components of this disk drive will not be described.

The phase-shift measurement module 12 according to the other embodiment reads the reproduced signal output from the reproduction module 11, by using a clock signal for reading the data recording bits formed on the magnetic disk 4. As shown in FIG. 9A, the phase-shift measurement module 12 acquires a read value corresponding to the black dot parts of the reproduced signal.

Next, as shown in FIG. 9B, the phase-shift measurement module 12 quantizes the read value thus acquired, obtaining a quantization value. On the basis of the quantization value thus obtained, the phase-shift measurement module 12 determines whether the reproduced signal is indefinite. If the reproduced signal is indefinite, the phase-shift measurement module 12 finds the phase-shift measuring bits that correspond to the reproduced signal found to be indefinite.

The phase-shift measurement module 12 calculates quantization value trains bi, bi−1 and ci from the reproduced signal, as shown in FIG. 9B. The quantization value train bi is $101X_1X_201$, the quantization value train bi−1 is $0101X_1X_20$, obtained at one clock pulse before the quantization value train bi. The quantization value train ci is the exclusive logical sum of the quantization value trains bi and bi−1. Assume that $X_iX_2$ contained in the quantization value train bi has been obtained by reading reproduced signal 600 near the phase-shift measuring bits of n=3.

If the reproduced signal is in normal state (not indefinite), the consecutive quantization values are 01s or 10s. On the other hand, if the reproduced signal is indefinite, the consecutive quantization values are 11s or 00s. If $X_1X_2$ in the quantization value train bi, for example, is 11 as shown in FIG. 9B, $Y_1Y_2Y_3$ in the quantization value train ci will be 001. If $X_1X_2$ contained in the quantization value train bi is 00, $Y_1Y_2Y_3$ contained in the quantization value train ci will be 100.

Hence, if the reproduced signal is indefinite, $Y_1Y_2Y_3$ contained in the quantization value train ci will have a part composed of consecutive 0s. If the phase-shift measurement module 12 detects a part composed of consecutive 0s, in the quantization value train ci, it will determine that the reproduced signal is indefinite. The phase-shift measurement module 12 then finds the phase-shift measuring bits (i.e., bits of n=3, in this case) that correspond to the reproduced signal determined to be indefinite.

As shown in FIG. 10, the phase-shift measurement module 12 according to this embodiment has two delay circuits 131 and 132, an exclusive OR (ExOR) gate 133, and a negated OR (NOR) gate 134.

The delay circuit 131 outputs the quantization value at one clock pulse before the present quantization value. The present quantization value is the quantization value contained in the quantization value train bi shown in FIG. 9B. The quantization value at one clock pulse before the present quantization value is the quantization value train bi−1 also shown in FIG. 9B. The ExOR gate 133 produces the exclusive logical sum of the present quantization value and the output value of the delay circuit 131, outputting a quantization value train ci as the exclusive logical sum value.

The delay circuit 132 outputs a quantization value train ci−1, i.e., the exclusive logical sum at one clock pulse before the quantization value train ci that is the present exclusive logical sum. The NOR gate 134 produces the negated logical sum of ci and ci−1 and outputs a value d. The value d output from the NOR gate 134 must be "1" so that the quantization value train ci may have a part composed of consecutive 0s. Therefore, the phase-shift measurement module 12 determines whether the value d is "1" or not. If the value d is "1," the phase-shift measurement module 12 determines that the quantization value train ci has a part composed of consecutive 0s, or that the reproduced signal is indefinite.

ANOTHER EMBODIMENT

FIGS. 11A, 11B and 12 are diagrams explaining still another embodiment of the present invention. The disk drive according to this embodiment is identical in configuration to the disk drive shown in FIG. 1, except the circuit configuration shown in FIG. 12. Hence, the other components of this disk drive will not be described.

In this embodiment, too, the phase-shift measurement module 12 according reads the reproduced signal output from the reproduction module 11, by using a clock signal for reading the data recording bits formed on the magnetic disk 4. As shown in FIG. 11A, the phase-shift measurement module 12 acquires a read value corresponding to the black dot parts of the reproduced signal.

Next, as shown in FIG. 11B, the phase-shift measurement module 12 quantizes the read value thus acquired, obtaining a quantization value. On the basis of the quantization value thus obtained, the phase-shift measurement module 12 determines whether the reproduced signal is indefinite. If the reproduced signal is indefinite, the phase-shift measurement module 12 finds the phase-shift measuring bits that correspond to the reproduced signal found to be indefinite.

The phase-shift measurement module 12 calculates quantization value trains bi, bi−2 and ei from the reproduced signal, as shown in FIG. 11B. The quantization value train bi is $101X_1X_201$, the quantization value train bi−2 is $10101X_1X_2$, obtained at two clock pulses before the quantization value train bi. The quantization value train ei is the exclusive logical sum of the quantization value trains bi and bi−2. Assume that $X_iX_2$ contained in the quantization value train bi has been obtained by reading reproduced signal 600 near the phase-shift measuring bits of n=3.

If the reproduced signal is in normal state (not indefinite), the consecutive quantization values are 10s or 01s, and the quantization value train ei is composed of 0s. On the other hand, if the reproduced signal is indefinite, the consecutive quantization values are 11s or 00s. If $X_1X_2$ in the quantization value train bi, for example, is 11 as shown in FIG. 11B, the value $Z_1Z_2Z_3Z_4$ in the quantization value train ei will be 0101. If $X_1X_2$ contained in the quantization value train bi is 00, the value $Y_1Y_2Y_3Z_4$ contained in the quantization value train ei will be 1010.

Hence, if the reproduced signal is indefinite, the quantization value train ei will contain 1s. If the phase-shift measurement module 12 detects a part composed of consecutive 1s, in the quantization value train ei, it will determine that the reproduced signal is indefinite. The phase-shift measurement module 12 then finds the phase-shift measuring bits (i.e., bits of n=3, in this case) that correspond to the reproduced signal determined to be indefinite.

As shown in FIG. 12, the phase-shift measurement module 12 according to this embodiment has two delay circuits 141 and 142 and an exclusive OR (ExOR) gate 143. The delay circuit 141 outputs a quantization value at one clock pulse before the input quantization value. The delay circuit 141 outputs a quantization value at one clock pulse before the quantization value output from the delay circuit 141. That is, the delay circuit 141 outputs a quantization value (bi−2) at two clock pulses before the present quantization value input to the delay circuit 141.

The ExOR gate 143 produces the exclusive logical sum of the present quantization value bi and the value bi−2 output from the delay circuit 142, and outputs a quantization value train ei. The phase-shift measurement module 12 determines whether the quantization value train ei is "1" or not. If the quantization value train ei is "1," the phase-shift measurement module 12 determines that the reproduced signal is indefinite.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a magnetic disk of the bit-patterned media type, comprising a data record area including data recording bits and a measurement area including phase-shift measuring bits, wherein each phase-shift measuring bit is arranged at a predetermined distance from the cyclic reference position of a data recording bit;
a reproduction module configured to output a reproduced signal corresponding to the phase-shift measuring bits on the magnetic disk; and
a measurement module configured to calculate a quantization value of the reproduced signal, to find the phase shift measuring bits corresponding to the reproduced signal when the reproduced signal is determined to be indefinite, and to determine the phase shift corresponding to the phase-shift measuring bits found, wherein the phase shift is of a write clock signal,
wherein the measurement module is configured to calculate an exclusive logical sum of a present quantization value of the reproduced signal and a quantization value at one clock pulse before the present quantization value, and is further configured to determine that the reproduced signal is indefinite when the exclusive logical sum is 0.

2. A disk drive comprising:
a magnetic disk of the bit-patterned media type, comprising a data record area including data recording bits and a measurement area including phase-shift measuring bits, wherein each phase-shift measuring bit is arranged at a predetermined distance from the cyclic reference position of a data recording bit;
a reproduction module configured to output a reproduced signal corresponding to the phase-shift measuring bits on the magnetic disk; and
a measurement module configured to calculate a quantization value of the reproduced signal, to find the phase shift measuring bits corresponding to the reproduced signal when the reproduced signal is determined to be indefinite, and to determine the phase shift corresponding to the phase-shift measuring bits found, wherein the phase shift is of a write clock signal,
wherein the measurement module is configured to calculate a negated exclusive logical sum of a present quantization value of the reproduced signal and a quantization value at one clock pulse before the present quantization value, and is further configured to determine that the reproduced signal is indefinite when the negated logical sum is 1.

3. A disk drive comprising:
a magnetic disk of the bit-patterned media type, comprising a data record area including data recording bits and a measurement area including phase-shift measuring bits, wherein each phase-shift measuring bit is arranged at a predetermined distance from the cyclic reference position of a data recording bit;
a reproduction module configured to output a reproduced signal corresponding to the phase-shift measuring bits on the magnetic disk; and
a measurement module configured to calculate a quantization value of the reproduced signal, to find the phase shift measuring bits corresponding to the reproduced final when the reproduced signal is determined to be indefinite, and to determine the phase shift corresponding to the phase-shift measuring bits found, wherein the phase shift is of a write clock signal, wherein the measurement module is configured to calculate an exclusive logical sum of a present quantization value of the reproduced signal and a quantization value at two clock pulses before the present quantization value, and is further configured to determine that the reproduced signal is indefinite when the exclusive logical sum is 1.

4. A method of measuring, in a disk drive comprising a magnetic disk of bit-patterned media type, a phase shift that a write clock signal has with respect to data recording bits provided on the magnetic disk, the magnetic disk comprising a data record area including the data recording bits and a measurement area including phase-shift measuring bits wherein each phase-shift measuring bit is arranged at a predetermined distance from the cyclic reference position of a data recording bit, the method comprising:

reading the phase-shift measuring bits provided on the magnetic disk;
obtaining a reproduced signal based on the reading,
calculating a quantization value of the reproduced signal;
determining whether the reproduced signal is indefinite, based, in part, on the quantization value; and
finding the phase shift measuring bits corresponding to the reproduced signal and determining the phase shift corresponding to the phase-shift measuring bits found if the reproduced signal is determined to be indefinite,
wherein the determining step comprises:
calculating an exclusive logical sum of a present quantization value of the reproduced signal and a quantization value of the reproduced signal at one clock pulse before, and
determining the reproduction signal is indefinite when the exclusive logical sum is 0.

5. A method of measuring, in a disk drive comprising a magnetic disk of bit-patterned media type, a phase shift that a write clock signal has with respect to data recording bits provided on the magnetic disk, the magnetic disk comprising a data record area including the data recording bits and a measurement area including phase-shift measuring bits, wherein each phase-shift measuring bit is arranged at a predetermined distance from the cyclic reference position of a data recording bit, the method comprising:

reading the phase-shift measuring bits provided on the magnetic disk;
obtaining a reproduced signal based on the reading,
calculating a quantization value of the reproduced signal;
determining whether the reproduced signal is indefinite, based, in part, on the quantization value; and
finding the phase shift measuring bits corresponding to the reproduced signal and determining the phase shift corresponding to the phase-shift measuring bits found if the reproduced signal is determined to be indefinite,
wherein the determining step comprises:
calculating a negated exclusive logical sum of a present quantization value of the reproduced signal and a quantization value of the reproduced signal at one clock pulse before, and
determining the reproduction signal is indefinite when the negated exclusive logical sum is 1.

6. A method of measuring, in a disk drive comprising a magnetic disk of bit-patterned media type, a phase shift that a write clock signal has with respect to data recording bits provided on the magnetic disk, the magnetic disk comprising a data record area including the data recording bits and a measurement area including phase-shift measuring bits, wherein each phase-shift measuring bit is arranged at a predetermined distance from the cyclic reference position of a data recording bit, the method comprising:

reading the phase-shift measuring bits provided on the magnetic disk;
obtaining a reproduced signal based on the reading,
calculating a quantization value of the reproduced signal;
determining whether the reproduced signal is indefinite, based, in part, on the quantization value; and
finding the phase shift measuring bits corresponding to the reproduced signal and determining the phase shift corresponding to the phase-shift measuring bits found if the reproduced signal is determined to be indefinite,
wherein the determining step comprises:
calculating an exclusive logical sum of a present quantization value of the reproduced signal and a quantization value of the reproduced signal at two clock pulses before, and
determining the reproduction signal is indefinite when the exclusive logical sum is 1.

* * * * *